May 1, 1951      J. C. CROWLEY      2,551,487

TIRE PRESSURE GAUGE

Filed Dec. 19, 1947

INVENTOR
JOHN C. CROWLEY

BY Hyde, Meyer, Baldwin & Doran

ATTORNEYS

Patented May 1, 1951

2,551,487

UNITED STATES PATENT OFFICE 2,551,487

TIRE PRESSURE GAUGE

John C. Crowley, Willoughby, Ohio

Application December 19, 1947, Serial No. 792,675

5 Claims. (Cl. 73—419)

This invention relates to pressure gauges and more particularly, to pressure gauges for use in testing the inflation pressure of pneumatic tires.

The invention has for one of its objects the provision of a simple and improved tire pressure gauge comprising a tubular casing in which is longitudinally mounted for endwise movement a plunger provided with pressure designating indicia, said plunger being projectable from said casing by the inflation pressure of the tire being tested and being frictionally retained in its projected position, for convenient observation of the designated pressure, pending its manual return to a position within said casing.

A further object of the present invention is the provision of a tire pressure gauge which is small enough to be carried in a vest pocket or equivalent space and yet which is easy and convenient to "read" because of the magnifying means provided for the casing windows through which the pressure designating indicia of the plunger is observed.

A further object of the present invention is the provision of a tire pressure gauge in which the casing windows for the observation of the pressure designating indicia of the plunger are provided with magnifying lenses which are integral parts of the gauge casing, with the result that the provision of such lenses adds but little to the cost of the gauge.

A further object of the present invention is the provision of a tire pressure gauge which may be readily and easily adjusted at any time should the gauge be inaccurate in its pressure designations.

A further object of the present invention is the provision of a tire pressure gauge in which the indicia-carrying plunger thereof is capable of being easily and quickly removed from the gauge casing for purposes of adjustment for gauge accuracy, but in which projection of the plunger from the casing by air pressure is limited by simple and inexpensive means with which the plunger is provided.

A further object of the present invention is the provision of a tire pressure gauge in which the plunger thereof, between its indicia and the piston by which the plunger is moved under pressure, is provided with a tortuous portion capable of being readily deformed to vary the plunger length, thereby enabling adjustment of the gauge for accurate pressure designations to be easily, quickly and conveniently effected.

A further object of the present invention is the provision of a tire pressure gauge in which the casing end opening through which the plunger is projected is normally closed against the entrance of dirt and the like by a simple and inexpensive cap with which the plunger is provided.

A further object of the present invention is the provision of a tire pressure gauge which is characterized by its structural simplicity, the economy of its manufacture, and its reliability and dependability in use.

Further objects of the present invention, and certain of its practical advantages, will be referred to in or will be evident from the following description of a tire pressure gauge embodying the invention, as illustrated in the accompanying drawing, in which Fig. 1 is an enlarged side elevational view of such tire pressure gauge, the plunger thereof which carries the pressure designating indicia being partly projected from the gauge casing;

Before the tire pressure gauge here illustrated is specifically described, it is to be understood that the invention here involved is not limited to the exact structural details or the particular arrangement of parts here shown, as tire pressure gauges embodying the present invention may take other forms. It also is to be understood that the phraseology or terminology herein used is for purposes of description and not of limitation, as the scope of the present invention is denoted by the appended claims.

For the disclosure of one embodiment of the present invention, there is illustrated in Figs. 1 to 7 inclusive a tire pressure gauge in which the principal parts thereof are (a) a tubular casing 10 having an air chuck at its inner or lower end and having intermediate its ends a pair of diametrically opposed observation windows for the pressure designating indicia of the gauge; (b) a piston 11 slidably mounted in said casing and normally located adjacent the air chuck at the inner or lower end of the casing, said piston being movable by air pressure toward the outer or upper end of the casing; (c) a coiled compression spring 12 engaging said piston for returning said piston to its normal position adjacent said air chuck upon the release of said air pressure; and (d) a plunger 13 which carries the pressure designating indicia of the gauge and which is projectable by said plunger outwardly or upwardly through the outer or upper end of the casing for pressure designations, said plunger being frictionally retained by the casing in the projected position to which it is moved by said piston and being manually returnable to its normal or "zero reading" position within the casing and against said piston.

The tubular casing 10 may be of any desired size and of any suitable material or materials. Preferably, the casing is quite small, the one here shown having a length of approximately two and one-half inches and an outside diameter of approximately half an inch. As the plunger 13 is completely enclosed by the casing 10 except when in pressure designating position, the gauge is of a size which enables it to be conveniently carried in a purse, vest pocket or equivalent space. However, as the observation windows of the casing are of magnifying character, as will hereinafter appear, the pressure designating indicia of the plunger may be easily and conveniently read, notwithstanding the small size of said indicia and the gauge as a whole.

Although the casing 10 may be made of one or of a combination of materials, such as metal, hard rubber, etc., the casing here shown is made entirely of an organic plastic material, such as methyl methacrylate. For manufacturing economy and ease of assembly of parts enclosed thereby, the casing 10 is of two sectional form, the two casing sections being identical and being cemented together or otherwise suitably united after the parts enclosed thereby are positioned therein.

Figures 2, 3:
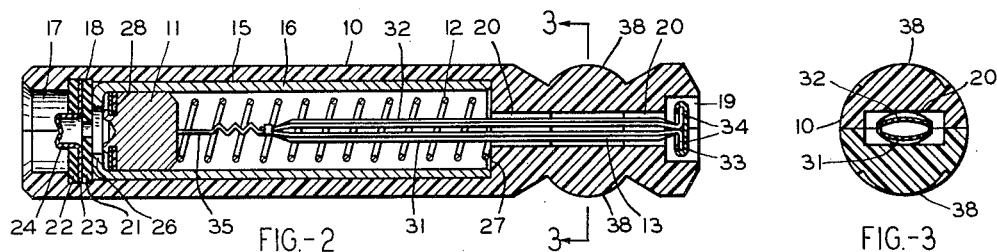
Fig. 2 is a correspondingly enlarged longitudinal sectional view of the gauge, on the line 2—2 of Fig. 1, with the plunger in its normal position within the gauge casing.
Fig. 3 is a correspondingly enlarged cross-sectional view of the gauge, on the line 3—3 of Fig. 2.

As shown in Fig. 2, the casing bore is of varying cross-sectional size throughout its length. Intermediate its ends and for the major portion of its length, the casing bore has a cylindrical section 15 which, in the present embodiment of the invention, snugly receives a guiding sleeve 16 for the piston 11. At its inner or lower end, the casing bore has a somewhat smaller cylindrical bore section 17 to receive the stem of a tire valve (not shown), as will hereinafter more fully appear. Between the bore sections 15 and 17, there is a short cylindrical bore section 18 which is somewhat larger than that of the intermediate bore section 15 and which receives and retains the air chuck hereinafter described. At its outer or upper end, the casing bore has a short cylindrical bore section 19 which receives the outer end cap of the plunger 13, and between this outer or upper end bore section 19 and the intermediate bore section 15 there are two oval-shaped bore sections 20, separated by the magnifying windows of the casing, and which frictionally grip and guide the plunger 13 in its sliding movement.

The air chuck of the present gauge, for which the bore section 18 is provided, may, of course, be of any suitable form. As here shown, it comprises an upper centrally apertured sealing gasket 21, a lower and centrally apertured sealing gasket 22, and an intermediate tire valve depressor element 23 having an apertured cup-shaped depressor portion 24 projecting downwardly through the aperture of the lower gasket 22 and into the bore section 17 which receives the tire valve stem.

The piston-guiding sleeve 16 which snugly fits within the intermediate casing bore section 15 may be, and here is a metal tube of brass or the like, the use of metal for said sleeve being especially desirable if the gauge casing is of an organic plastic material with relatively low dimensional stability. As here shown, the inner or lower end of the sleeve 16 is partially closed by an integral annular flange 26 against which the piston 11 is normally seated by the coiled compression spring 12, the inner or lower end of said spring engaging said piston and the outer or upper end of said spring engaging an annular shoulder 27 of the casing at the outer end of the intermediate bore section 15.

As here shown, the piston 11 is a cylindrical rod-like member of brass or other suitable material having a sealing gasket 28 secured to its lower or base face. For purposes of such securement, the piston is here provided with a central, inwardly projecting extension which is surrounded by said gasket and by a gasket-clamping disc, the free or inner end of said piston extension being peened over said disc, as shown in Fig. 2.

Figure 4:
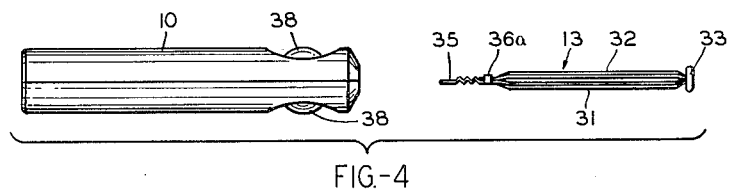
Fig. 4 is a side elevational view showing the plunger and the gauge casing in separated relationship, the parts being of a size more or less representative of their actual size as to the present embodiment of the invention.
Figure 5:
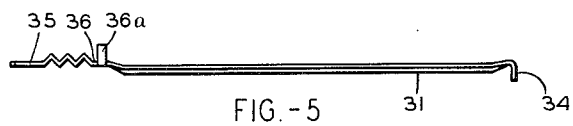
Fig. 5 is a side elevational view, on the enlarged scale of Figs. 1 to 3 inclusive, of one of the two elongated plunger members.

Engaging the upper or outer face of the piston 11 but free of connection or attachment to the piston is the plunger 13 which carries the pressure designating indicia of the gauge. As here shown, said plunger comprises two elongated spring metal members 31 and 32 arranged in lateral alignment and connected at their outer ends by a disc-like cap 33. In this particular embodiment of the invention, the outer end portions of the two plunger members 31 and 32 are of flat form and in abutting relationship, and are provided with oppositely extending end flanges 34 over which the cap 33 is crimped or otherwise suitably secured for the connection of the outer ends of the plunger members, as shown in Figs. 2 and 4.

Figure 6:
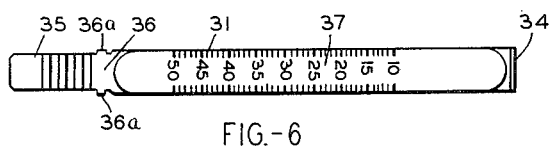
Fig. 6 is a correspondingly enlarged front elevational view of the plunger member of Fig. 5.

As will be evident from a comparison of Figs. 6 and 7, the two plunger members 31 and 32 differ only in that one of said members, such as the one here designated by the reference numeral 31, is provided with a piston-engaging extension 35 at its inner end (an extension to be hereinafter referred to), and also is provided with a pair of side tabs 36a integral with a generally flat portion 36 of the plunger member 31 adjacent the outer end of its piston-engaging extension 35. As best shown in Figs. 2 and 4, the side tabs 36a of plunger member 31 are bent over the generally flat inner end portion of the other plunger member 32 to connect, but not tightly or rigidly, the two plunger members at the inner end of plunger member 32. Between their two sets of connected portions (the plunger members also being connected at their outer ends, as heretofore pointed out), the two plunger members are in spaced relation, with such spaced intermediate portions thereof being of convex or oppositely bowed form in cross section, as best shown in Fig. 3.

On the outermost surfaces of their laterally spaced intermediate portions, the two plunger members 31 and 32 are here provided with identical graduated scales 37 which constitute the pressure designating indicia of the gauge and which enable the gauge to be "read" from either side thereof. As will be readily understood, these scales 37, graduated in terms of tire inflation pressure, may be applied to the plunger members 31 and 32 in any suitable manner and by any suitable means, such as by being formed directly in the metal of the plunger members or by the use of separate sheet-like strips on which the scales appear and which are adhesively or otherwise suitably secured to the plunger members.

Figure 1:
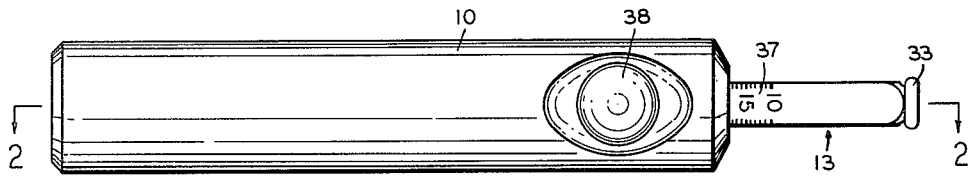

Inasmuch as the gauge as a whole is quite small in size, as heretofore pointed out, the pressure designating indicia of the plunger is, of necessity, much smaller. However, to enable the gauge to be easily and conveniently "read," notwithstanding the small size of its pressure designating indicia, the gauge casing 10 has magnifying windows for the observation of such indicia. As best shown in Figs. 1 and 2, there are two such windows, in diametrically opposed relation, and each such window is provided with a magnifying lens 38 for the plunger indicia therebehind. As here shown, each such lens is of simple plano-convex form, and if the gauge casing is of transparent material, such as the transparent methyl methacrylate organic plastic material of the present casing, the lenses 38 may be, as here, integral parts of said casing, as best shown in Fig. 2. However, if desired and regardless of the nature of the material of which the gauge casing is made, the lenses 38 of the magnifying observation windows may be separate members and suitably secured to the gauge casing, as will be readily understood.

To adjust the gauge, for accurate designation of the inflation pressure of the tire being tested, it is merely necessary to vary the length of the piston-engaging extension 35 of the plunger 13, the extension being shortened if the gauge is "reading" too low and lengthened if the gauge is "reading" too high. To enable the plunger extension 35 to be easily, quickly and conveniently deformed to vary the length thereof, such extension is of tortuous form, such as the zig-zag form here shown, and inasmuch as the plunger may be readily withdrawn from the gauge casing (it being free of connection or attachment to the piston 11, as heretofore pointed out), it is a simple and easy matter to vary the length of the plunger extension 35 for adjustment of the gauge, as will be readily understood.

In the use of the gauge, its inner or lower end is applied to the valve stem of the tire whose inflation pressure is to be tested, the outer or upper end of said tire stem entering the casing bore section 17 at the inner or lower end of the gauge. By downward movement of the gauge relative to said tire stem, the tire valve is depressed and thereby opened by the depressor portion 24 of the air chuck of the gauge, with the consequent entrance of air from the tire into the gauge, through the air chuck thereof and against the lower or base face of the piston 11. Under the pressure of this incoming air, the piston is moved upwardly or outwardly, with corresponding movement of the abutting plunger 13, the extent of such upward or outward movement of the piston and the plunger being dependent, of course, upon the inflation pressure of the tire.

To releasably retain the plunger 13 in the outward projected position to which it is moved by the piston 11 as the result of such air pressure, and to thereby enable the gauge to be "read" after its removal from the tire valve stem, the casing bore section 20 on opposite sides of the magnifying lenses 38 are of a size and shape to frictionally grip and retain the resilient, laterally spaced intermediate portions of such plunger, as will be evident from Fig. 3. Inasmuch as such intermediate, laterally spaced portions of the plunger are of convex or outwardly bowed form in cross section, as shown in Fig. 3, the plunger gripping casing bore sections 20 on opposite sides of the magnifying lenses 38 are of generally oval shape in cross section, as shown in such view. Therefore, although the piston 11 is immediately returned by the spring 12 to its normal position adjacent the air chuck upon removal of the gauge from the tire valve stem, the gauge plunger will remain in the position to which it is projected by the inflation pressure of the tire being tested, so that such pressure may be easily and conveniently "read." As heretofore pointed out, even though the plunger indicia is quite small in size, such indicia is easily "read" because of its magnification by the lenses 38 of the observation windows of the gauge casing.

After the tire inflation pressure is noted, the plunger is manually pushed back into the gauge casing 10, as in Fig. 2, with the plunger cap 33 at the outer end thereof serving as an effective closure for the outer end of the gauge against the entrance of dirt and the like, as will be evident from Fig. 2.

Figures 7, 9:
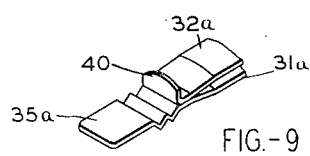
Fig. 7 is a view corresponding to Fig. 6 but showing the other elongated plunger member.
Fig. 9 is a correspondingly enlarged perspective view of the inner end portion of the plunger of Fig. 8.
Figure 8:
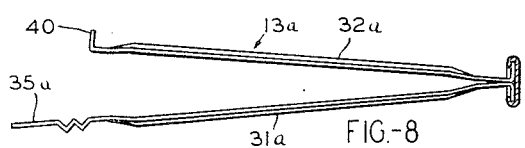
Fig. 8 is an enlarged side elevational view of a modified form of plunger, one having means for limiting its projection by air pressure from the gauge casing.

If it is desired to normally prevent complete ejection or withdrawal of the plunger from the gauge casing, and yet permit, when desired, removal of the plunger for purposes of adjustment, a plunger of the character illustrated in Figs. 8 and 9 may be used. As will be noted from Fig. 8, the two plunger members 31a and 32a of the plunger 13a are connected only at their outer ends, with the unconnected portions of said members having a normal tendency to separate, as shown. Also as will be noted, the shorter plunger member 32a is provided at its inner end with an end flange 40 extending laterally outward, a flange which by its cooperative engagement with the annular shoulder 27 of the gauge casing 10 constitutes a positive stop to further outward movement of the plunger relative to such casing.

To insert the plunger 13a into the gauge casing 10 and to remove such plunger from said casing, it is merely necessary to bring the two plunger members 31a and 32a into juxtaposition, with the flanged inner end of member 32a in abutting relation with the flattened portion of member 31a adjacent its tortuous inner end extension 35a, as in Fig. 9. As will be noted from Fig. 9, the outer end edge of flange 40 of the plunger member 32a is of convex shape, to conform, of course, to the oval shape of the casing bore sections 20 where the casing frictionally grips the plunger for its releasable retention in any projected position to which it may be moved. Normally, the inner end flange 40 of the plunger lies within the enlarged casing bore section 15 which receives the piston-guiding sleeve 16, and thus the inner end portions of the two plunger members are normally in separated relationship, as will be readily understood. If the plunger is moved outwardly, by air pressure or otherwise, and without bringing the two plunger members into abutting relationship at the flanged inner end of member 32a, the flange 40 of such plunger member will strike the casing shoulder 27 at the outer end of the casing bore section 15 and thus prevent further outward movement of the plunger, as will be readily understood. However, when it is desired to remove the plunger from the casing, such as when it is necessary to vary the length of the plunger extension 35a, such removal can be readily effected in the manner described.

To those skilled in the art to which the present invention relates, other features and advantages of tire pressure gauges embodying the invention will be evident from the foregoing description of one such gauge.

What I claim is:

1. A tire pressure gauge, comprising a tubular casing, a piston slidably mounted in said casing and movable in one direction by air pressure, a plunger engageable by said piston for movement therewith in such direction, said plunger being free of connection to said piston and being endwise removable from said casing, pressure designating indicia carried by said plunger, said plunger comprising two laterally aligned members connected at their outer ends and their unconnected inner ends having a normal tendency to separate, and an abutment carried by the inner end of one of said plunger members and cooperable with an internal opposing abutment carried by said casing to limit the extent to which said plunger can be moved by said piston, said plunger being endwise removable from said casing by bringing the abutment carrying inner end of said one plunger member into juxtaposition relative to said other plunger member.

2. A tire pressure gauge, comprising a tubular casing of an organic plastic material, a piston slidably mounted in said casing and movable in one direction by air pressure, a plunger engageable by said piston and movable therewith in such direction, pressure designating indicia carried by said plunger, a guiding sleeve of non-plastic material for said piston in spaced relation relative to one end of said casing, said casing being provided with an integral lens between such end thereof and said piston guiding sleeve for the observation of said plunger indicia, means for moving said piston in the opposite direction upon release of said air pressure, and means integral with said casing for releasably maintaining said plunger in any position to which it is moved by said piston.

3. A tire pressure gauge, comprising a tubular casing, a piston slidably mounted in said casing and movable in one direction by air pressure, a plunger engageable by said piston for movement therewith in such direction, pressure designating indicia carried by said plunger, said plunger comprising a pair of laterally aligned members connected at their outer ends with their unconnected portions having a normal tendency to diverge, one of said plunger members having a portion projecting beyond the other plunger member for engagement by said piston, such projecting portion of said plunger member being of a form to enable its length to be varied for adjustment of the gauge as to its pressure designations, and the other plunger member having an abutment for cooperation with an abutment of the casing to limit the extent of movement of the plunger by said piston.

4. A tire pressure gauge, comprising a tubular casing having an open end, a piston slidably mounted in said casing and movable by air pressure toward the open end of the casing, a plunger in said casing engageable by said piston and movable therewith in the direction of the open end of the casing, said plunger being free of connection to said piston and being readily withdrawable from the casing through the open end thereof by simple endwise movement of the plunger, and pressure designating indicia carried by said plunger, the plunger being provided between its indicia and said piston with a deformable portion of generally zig-zag form to enable the location of the plunger indicia relative to the piston to be adjusted by deformation of said generally zig-zag portion, the ready removability of the plunger from the casing enabling such adjustment to be easily and quickly made.

5. A tire pressure gauge, comprising a tubular casing having an open end, a piston slidably mounted in said casing and movable by air pressure toward said open end of the casing, a plunger in said casing having two laterally aligned elongated parts, at least one of which is provided with pressure designating indicia, one of said plunger parts being longer than the other, with a portion of the longer plunger part projecting beyond the shorter plunger part for engagement by said piston, to thereby enable the plunger to be moved by said piston through the open end of the casing upon movement of the piston by air pressure, the shorter plunger part being provided at its inner end with an outturned shoulder and the casing having a cooperating opposing shoulder to normally limit the movement of the plunger outwardly through the open end of the casing, the projecting portion of the longer plunger part being of a character to enable its length to be readily varied to thereby vary the location of the plunger indicia relative to the piston.

JOHN C. CROWLEY.

REFERENCES CITED

The following references are of record in the file of this patent:

UNITED STATES PATENTS

| Number | Name | Date |
|---|---|---|
| 1,742,740 | Watters | Jan. 7, 1930 |
| 1,774,153 | Pfeiffer | Aug. 26, 1930 |
| 1,813,249 | Mitchell et al. | July 7, 1931 |
| 1,923,776 | Crowley | Aug. 22, 1933 |
| 1,937,928 | Wedin | Dec. 5, 1933 |
| 2,051,811 | Asmussen | Aug. 25, 1936 |
| 2,351,455 | Pratesi | June 13, 1944 |
| 2,389,282 | Stegeman | Nov. 20, 1945 |
| 2,427,199 | Crowley | Sept. 9, 1947 |